(12) United States Patent
Bollman

(10) Patent No.: US 8,201,098 B1
(45) Date of Patent: Jun. 12, 2012

(54) SENDING APPLICATION CAPTURES IN PERSONAL COMMUNICATION

(75) Inventor: Jeff Bollman, Arlington, VA (US)

(73) Assignee: AOL, Inc., Dulles, VA (US)

( * ) Notice: Subject to any disclaimer, the term of this patent is extended or adjusted under 35 U.S.C. 154(b) by 352 days.

(21) Appl. No.: 11/688,382

(22) Filed: Mar. 20, 2007

Related U.S. Application Data

(60) Provisional application No. 60/863,833, filed on Nov. 1, 2006.

(51) Int. Cl.
*G06F 3/00* (2006.01)
(52) U.S. Cl. .............. 715/769; 715/770; 715/751
(58) Field of Classification Search .......... 715/769, 715/770, 751; 345/179
See application file for complete search history.

(56) References Cited

U.S. PATENT DOCUMENTS

| | | | |
|---|---|---|---|
| 7,269,794 B2 * | 9/2007 | Martinez et al. | 715/758 |
| 7,281,008 B1 * | 10/2007 | Lawrence et al. | 1/1 |
| 2003/0061210 A1 * | 3/2003 | Sasaki et al. | 707/3 |
| 2003/0169296 A1 * | 9/2003 | Ito | 345/770 |
| 2004/0257346 A1 * | 12/2004 | Ong et al. | 345/179 |
| 2005/0060656 A1 * | 3/2005 | Martinez et al. | 715/751 |
| 2005/0102630 A1 * | 5/2005 | Chen et al. | 715/770 |
| 2006/0056681 A1 * | 3/2006 | Matsumoto | 382/154 |
| 2006/0139493 A1 * | 6/2006 | Kim | 348/576 |

OTHER PUBLICATIONS

Mabrouk, "An Introduction to SnagIt", 2005, pp. 1-11.*
"Microsoft Introduces Revolutionary Screen-Capture Capability in Windos Media Technologies 7," http://www.microsoft.com/presspass/press/2000/Apr00/NABCapturePR.mspx, Apr. 7, 2000, 3 pages.
"Frequently Asked Questions," Feb. 8, 2005, http://www.webex.com/hk/en/support/tc_faq.htm, 13 pages.
"WebEx MediaTone Network, An In-depth White Paper," WebEx Communications, Inc., http://www.webex.com/pdf/wp_mediatone.pdf, 21 pages.

* cited by examiner

*Primary Examiner* — Boris Pesin
*Assistant Examiner* — Daeho Song
(74) *Attorney, Agent, or Firm* — Finnegan, Henderson, Farabow, Garrett & Dunner, LLP

(57) ABSTRACT

An application capture is distributed by an application capture trigger associated with an online communication session between a first user and a second user and generating an application capture associated with rendered portions of the first user's display in response to activation of the application capture trigger. The application capture is sent to the second user within the online communication session.

9 Claims, 11 Drawing Sheets

SENDING APPLICATION CAPTURES IN PERSONAL COMMUNICATION

CROSS-REFERENCE TO RELATED APPLICATIONS

This application claims priority to U.S. Provisional Application Ser. No. 60/863,833, filed on Nov. 1, 2006, entitled "Sending Application Captures in Personal Communication," the entire contents of which is incorporated by reference.

TECHNICAL FIELD

This disclosure relates to the distribution of application captures.

BACKGROUND

Individuals may wish to preserve a rendered portion of a computer display. By generating an application capture, an individual may save an image of objects rendered on a computer display.

SUMMARY

In one general aspect, distributing an application capture includes activating an application capture trigger associated with an online communication session between a first user and a second user and generating an application capture associated with rendered portions of the first user's display in response to activation of the application capture trigger. The application capture is sent to the second user within the online communication session.

Implementations may include one or more of the following features. For instance, a trigger may be activated which is associated with a personal communication configured to enable generation of an application capture to be sent through the personal communication. An icon may be selected on the personal communication, where the icon is configured to enable generation of an application capture to be sent through the personal communication without requiring manual selection of a saved file corresponding to the application capture.

A shape may be generated which encloses an area of a rendered portion of the first user's display. The shape may include a box of a size determined by the user's movements of a mouse. Generating the shape may include drawing an area by a user's movements of a mouse. A predefined portion of a first user's display may be used to take an application capture of contents within the predefined portion. The location of the predefined portion may be moved by the first user.

An image file of the application capture may be sent to the second user. A file may be sent without requiring manual selection of a saved file corresponding to the application capture. The application capture may be rendered within a personal communication at the second user.

In another general aspect, distributing an application capture includes receiving an input directed to an application capture trigger from a first user. The input is associated with an online communication session between the first user and a second user. An application capture generated in response to the input is accessed from the first user. Information structured and arranged to render the application trigger is sent to the second user within the online communication session.

Implementations may include one or more of the features noted above. In addition, implementations may include receiving an input associated with a personal communication configured to enable generation of an application capture to be sent through the personal communication. Accessing an application capture may include accessing data other than a saved image file of the application capture. A file may be sent without requiring manual selection of a saved file corresponding to the application capture. The application capture may be rendered within a personal communication at the second user.

In a further general aspect, generating icons includes activating an application capture trigger and generating an application capture associated with rendered portions of a user's display in response to activation of the application capture trigger. All or part of an application capture may be assigned as an icon without requiring manual selection of a saved file corresponding to the application capture.

Implementations may include one or more of the features noted above. In addition, implementations may include activating a trigger configured to enable generation of an application capture to be set as a user specific icon. The activated trigger may be configured to enable generation of an application capture to be set as a user specific icon without requiring manual selection of a saved file corresponding to the application capture.

The details of one or more implementations are set forth below. Other features and advantages will be apparent from the description and drawings, and from the claims.

DESCRIPTION OF DRAWINGS

Like reference symbols in the various drawings indicate like elements.

DETAILED DESCRIPTION

A user may wish to share a view or picture (e.g., contents of a computer display) with another user over the interne. A current method of sharing views or pictures is emailing picture files to users. Such emailing of files may not always be feasible or practical. For example, a user wishing to share a view of an arrangement of windows or of a paused movie file may have difficulty taking a screen shot of just the area desired. Also, the generation and handling of computer files may be beyond the technical ability of some individuals.

In order to simplify sharing a view or picture, application captures may be generated and sent using personal communication software (e.g., AOL Instant Messenger). A user engaged in personal communications with a recipient may select an option to generate an application capture. The application capture may be generated in various way, including, for example, creating a box to include the desired content, or selecting a window. The application capture may be sent and presented within the personal communication without requiring either user to generate or handle individual files.

Figure 1:
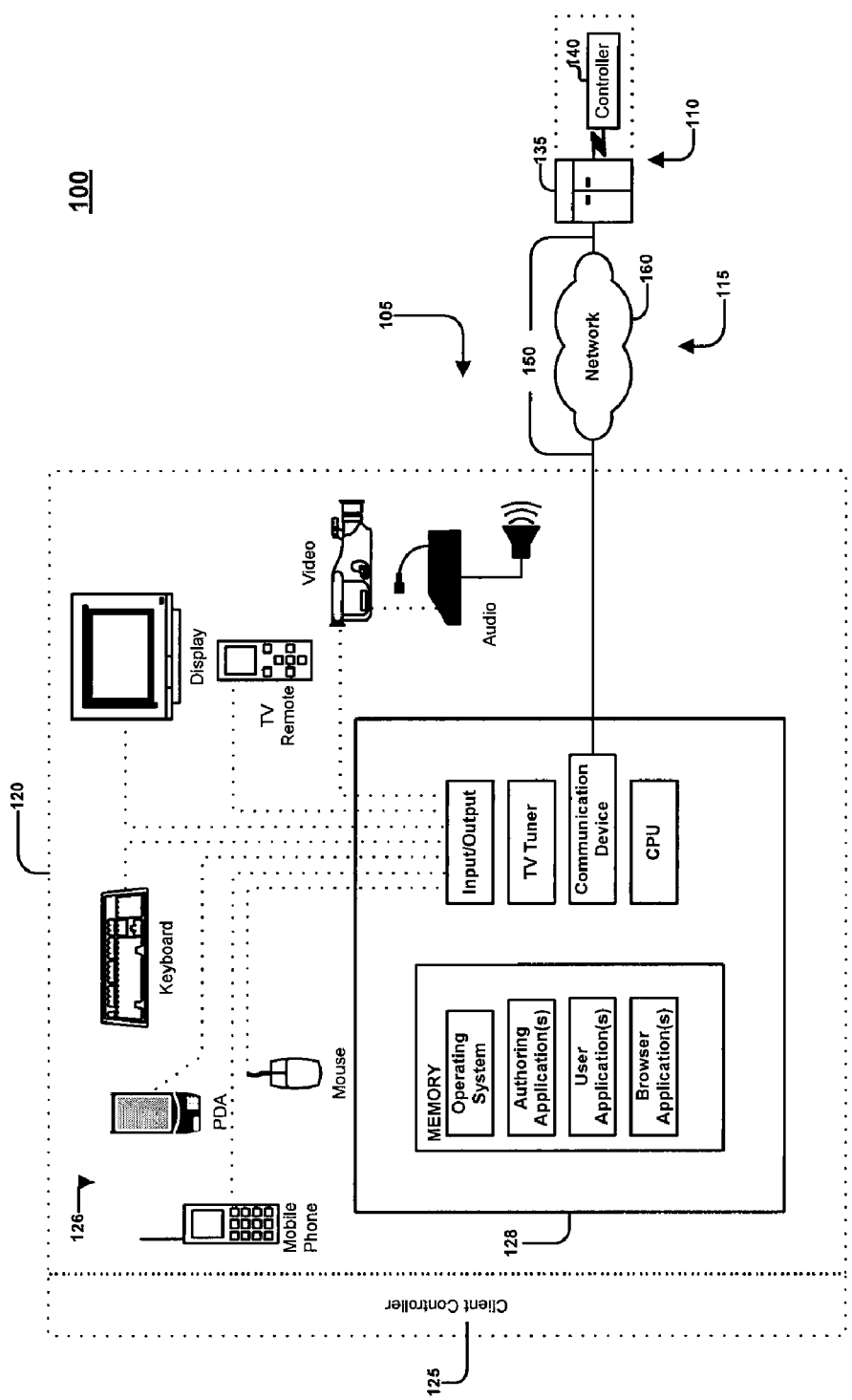
FIGS. 1 and 2 illustrate a communication system.

Referring to FIG. 1, communications system 100 is capable of delivering and exchanging data between a first communications participant system 105 and a host system 110 through a communications link 115. The first communications participant system 105 typically includes one or more user devices 120 and/or user controllers 125, and the host system 110 typically includes one or more host devices 135 and/or host controllers 140. For example, the first communications participant system 105 or the host system 110 may include one or more general-purpose computers (e.g., personal computers), one or more special-purpose computers (e.g., devices specifically programmed to communicate with each other and/or the first communications participant system 105 or the host system 110), or a combination of one or more general-purpose computers and one or more special-purpose computers. The first communications participant system 105 and the host system 110 may be arranged to operate within or in concert with one or more other systems, such as, for example, one or more LANs ("Local Area Networks") and/or one or more WANs ("Wide Area Networks").

The user device 120 and the host device 135 are generally capable of executing instructions under the command of, respectively, a user controller 125 and a host controller 140. The user device 120 and the host device 135 are connected to, respectively, the user controller 125 and the host controller 140 by, respectively, wired or wireless data pathways 130 and 145, which are capable of delivering data.

The user device 120, the user controller 125, the host device 135, and the host controller 140 typically each include one or more hardware components and/or software components. An example of a user device 120 or a host device 135 is a general-purpose computer (e.g., a personal computer) or software on such a computer capable of responding to and executing instructions in a defined manner. Other examples include a special-purpose computer, a workstation, a server, a device, a component, other physical or virtual equipment or some combination of these capable of responding to and executing instructions. The user device 120 and the host device 135 may include devices that are capable of establishing peer-to-peer communications.

An example of user controller 125 or host controller 140 is a software application loaded on the user device 120 or the host device 135 for commanding and directing communications enabled by the user device 120 or the host device 135. Other examples include a program, a piece of code, an instruction, a device, a computer, a computer system, or a combination of these for independently or collectively instructing the user device 120 or the host device 135 to interact and operate as described. The user controller 125 and the host controller 140 may be embodied permanently or temporarily in any type of machine, component, physical or virtual equipment, or storage medium capable of providing instructions to the user device 120 and the host device 135.

The communications link 115 typically includes a delivery network 160 that provides direct or indirect communication between the first communications participant system 105 and the host system 110, irrespective of physical separation. Examples of a delivery network 160 include the Internet, the World Wide Web, WANs, LANs, analog or digital wired and wireless telephone networks (e.g., Public Switched Telephone Network (PSTN), Integrated Services Digital Network (ISDN), and a type of Digital Subscriber Line (DSL)), radio, television, cable, or satellite systems, and other delivery mechanisms for carrying data. The communications link 115 may include one or more communication pathways 150 that enable communications through the one or more delivery networks 160 described above. The one or more communication pathways 150 may include, for example, a wired, wireless, cable or satellite communication pathway.

The first communication participant system 105 includes a user device that typically includes a general-purpose computer 128 having an internal or external memory for storing data and programs such as an operating system (e.g., Windows XP™ or Linux) and one or more application programs. Examples of application programs include authoring applications (e.g., word processing programs, database programs, spreadsheet programs, or graphics programs) capable of generating documents or other electronic content; user applications (e.g., America Online (AOL) client, AOL Instant Messenger (AIM) client, an interactive television (ITV) client, an Internet Service Provider (ISP) client, a communication client or a personal communications (IM) client) capable of communicating with other computer users, accessing various computer resources, and viewing, creating, or otherwise manipulating electronic content; and browser applications (e.g., Netscape's Navigator or Microsoft's Internet Explorer) capable of rendering standard Internet content and other content formatted according to standard protocols such as the Hypertext Transfer Protocol (HTTP). The application programs may be capable of generating application captures by preserving, as a picture, a rendered display (e.g., a screen shot). A user application may transfer the generated application capture to be displayed on a separate user device.

One or more of the application programs may be installed on the internal or external storage of the general-purpose computer 128. Alternatively, in another implementation, the user controller 125 may access application programs externally stored in and/or performed by one or more device(s) external to the general-purpose computer 128.

The general-purpose computer 128 also includes a central processing unit (CPU) for executing instructions in response to commands from the user controller 125, and a communication device for sending and receiving data. One example of the communication device is a modem. Other examples include a transceiver, a set-top box, a communication card, a satellite dish, an antenna, a network adapter, or some other mechanism capable of transmitting and receiving data over the communications link 115 through a wired or wireless data pathway 150. The general-purpose computer 128 optionally includes a television ("TV") tuner for receiving television programming in the form of broadcast, satellite, and/or cable TV signals. The TV tuner permits the user device 120 to selectively and/or simultaneously display network content received by communications device and TV programming content received by the TV tuner.

The general-purpose computer 128 may include an input/output interface that enables wired or wireless connection to various peripheral devices 126. Examples of peripheral devices 126 include, but are not limited to, a mouse, a mobile phone, a personal digital assistant (PDA), an MP3 player (not shown), a keyboard, a display monitor with or without a touch screen input, a TV remote control for receiving information from and rendering information to users, and an audio-visual input device.

Although FIG. 1 illustrates devices such as a mobile telephone, a PDA, and a TV remote control as being peripheral with respect to the general-purpose computer 128, in other implementations, such devices may themselves include the functionality of the general-purpose computer 128 and operate as the user device 120. For example, the mobile phone or the PDA may include computing and networking capabilities and function as a user device 120 by accessing the delivery network 160 and communicating with the host system 110. Furthermore, the first communication participant system 105 may include one, some or all of the components and devices described above.

Figure 2:
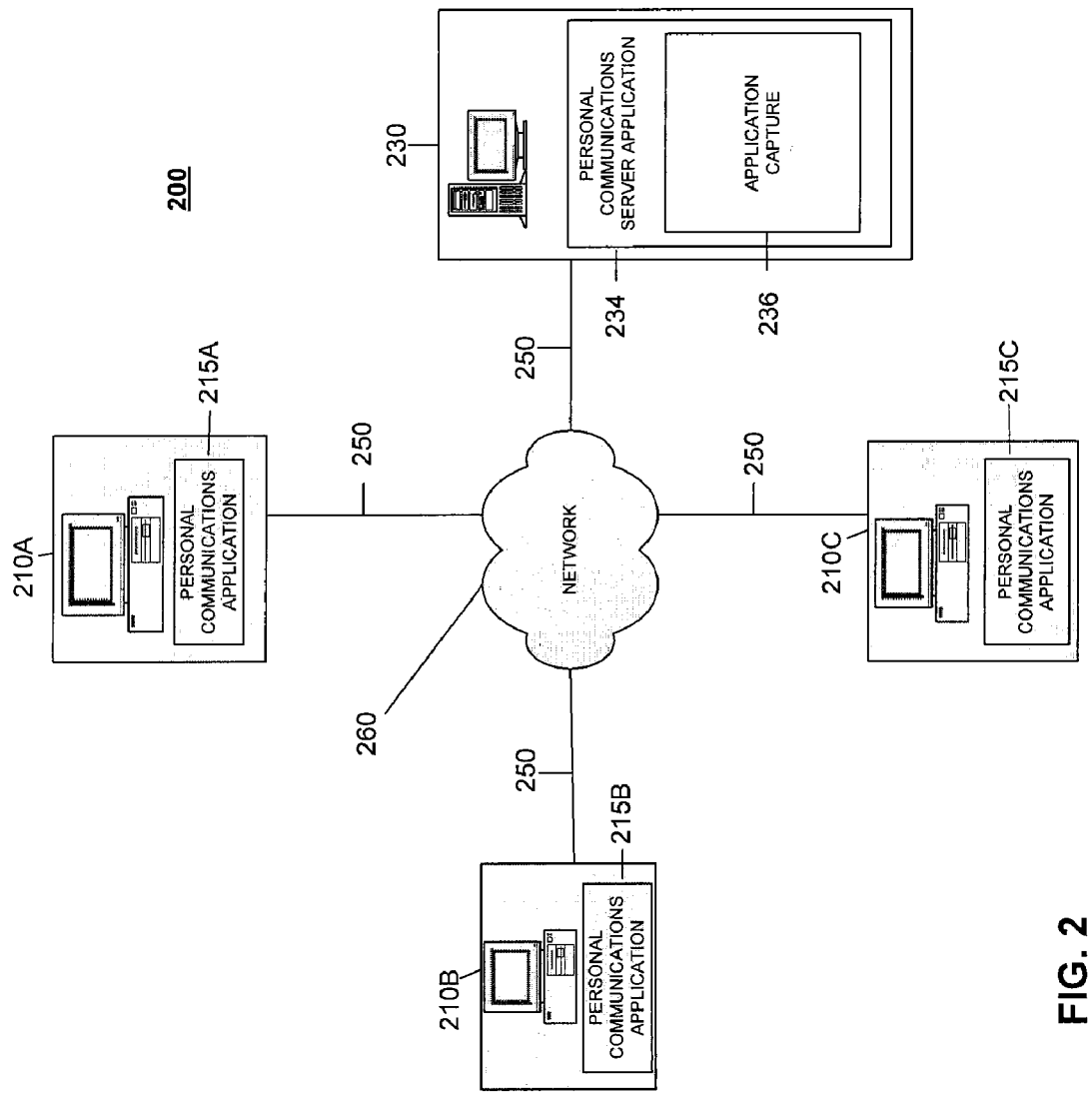

Referring to FIG. 2, a networked computing environment 200 supports communications between computer users. Users of the networked computing environment 200 are distributed geographically and communicate using user systems 210A-210C. Each of the user systems 210A-210C may be implemented as a user device 120 as in FIG. 1, or another device. The user systems 210A-210C are shown as including, respectively, personal communications applications 215A-215C. A delivery network 260 interconnects the user systems 210A-210C. The delivery network 260 may be the delivery network 160 of FIG. 1, or another network. The user systems 210A-210C are connected to the delivery network 260 through communication pathways 250. A host system 230 also may be connected to the delivery network 260 and may be used to facilitate some direct or indirect communications between the user systems 210A-210C. The host system 230 may be the host system 110 of FIG. 1, or another system. The host system 230 includes a personal communications server application 234.

The user systems 210A-210C and the host system 230 include a communications interface (not shown) used by the communications programs to send communications through the delivery network 260. The communications may include e-mail, audio data, video data, general binary data, or text data (e.g., encoded in American Standard Code for Information Interchange (ASCII) format). User systems also include one or more input devices, such as a keyboard, a mouse, a stylus, or a microphone, as well as one or more output devices, such as a monitor, a touch screen, speakers, or a printer.

The personal communications applications 215A-215C include participant lists that include communications identities (e.g., "buddies") with which instant messages are exchanged using the respective user systems 210A-210C. More particularly, each of the personal communications applications 215A-215C includes a participant list for each user that uses the user systems 210A-210C to send and receive instant messages. The personal communications applications 215A-215C enable the users to send and receive instant messages with the user systems 210A-210C. Instant messages are sent between users of the user systems 210A-210C through the personal communications server application 234 on the host system 230. The personal communications applications 215A-215C enable the generation of application captures. For example, the personal communications applications 215A-215C may generate an application capture (e.g., a screen shot that preserves a portion of the rendered screen). The application capture may then be sent to a personal communication application 215A-215C on a different one of user systems 210A-210C. The personal communications server application 234 routes instant messages sent with the personal communications applications 215A-215C. The application capture component 236 may route application captures between the user systems 210A-210C.

The networked computing environment 200 may be structured and arranged differently. For example, the personal communications applications 215A-215C may be located on the host system 230.

Figure 3:
FIG. 3 is an exemplary graphical user-interface including an application capture feature.

Referring to FIG. 3, an exemplary GUI 300 includes an application capture feature. The GUI 300 may be displayed using the system 200 shown in FIG. 2, or another system. The GUI 300 is a screen shot of a user, "Applicant," engaged in a personal communication with "Hamster Enthusiast." In the GUI 300, the user wishes to share a picture within the user's desktop wallpaper with another user with whom the first user is conversing using an Internet messaging service.

The personal communication 310 includes communication text 320, an application capture area select option 330, and a option to set capture preferences 340. The personal communication 310 enables users to send and receive text messages in a live or "real-time" format. The text messages are displayed as communication text 320. The application capture area select option 330 enables a user to select the area or object for capture using a method of selection. Multiple methods of selection may be used, as discussed below with respect to FIG. 4. The option to set capture preferences 340 may activate a window presenting options enabling configuration and selection of the application capture process. Various implementations may include personalized features in the personal communication 310. For example, a user specific icon or color may be included in the body of the personal communication 310.

The previous description is an example implementation of a GUI including personal communications and an application capture feature. Other implementations may be organized differently or may include other features. For example, as an alternative to an option to set capture preferences 340, multiple capture options may be displayed on the personal communication 310 to enable manipulation of capture characteristics within the personal communication 310.

Figure 4:
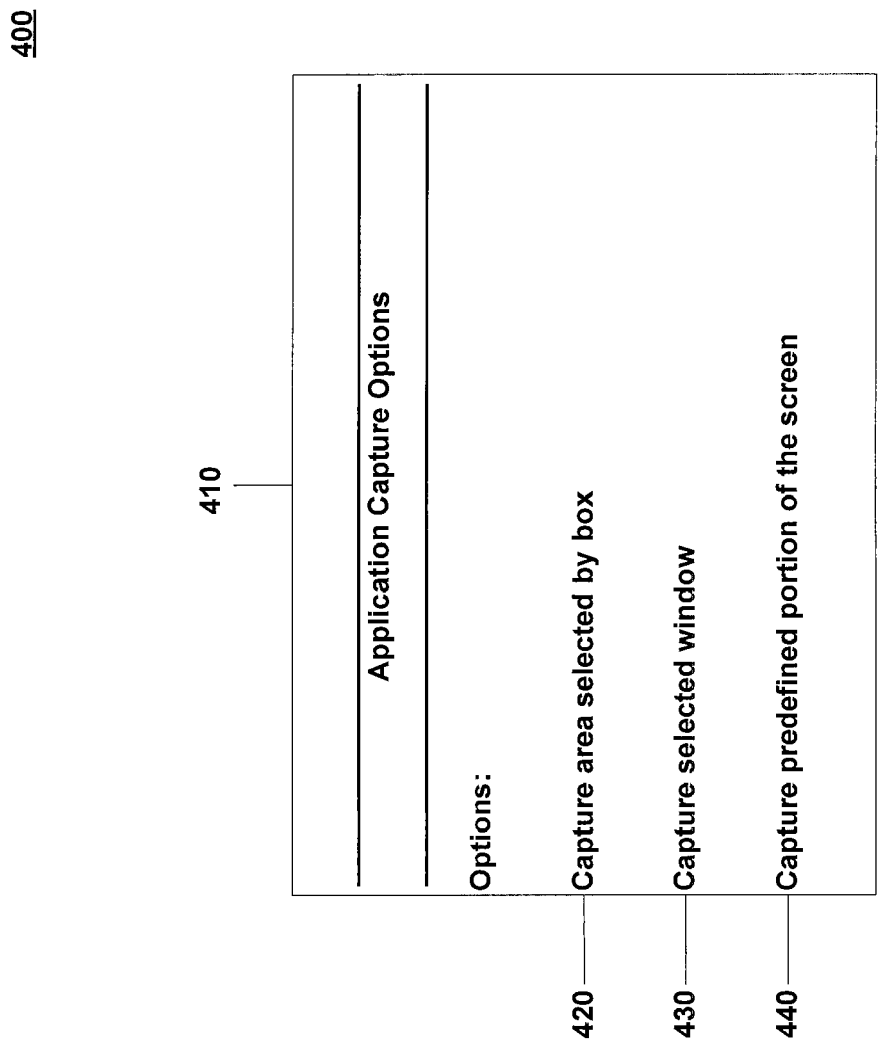
FIG. 4 is an exemplary graphical user-interface of a capture option window for application captures.

Referring to FIG. 4, an exemplary GUI 400 includes a capture option window 410 for application captures. The GUI 400 may be displayed using the system 200 shown in FIG. 2, or another system. The capture option window 410 may be displayed in response to a selection of the option to set capture preferences 340 in FIG. 3. The capture option window 410 includes options 420-440 that enable a user to set characteristics of an application capture. A selected by box option 420 enables a user to select an area for application capture with a cursor by creating a box encompassing the desired area. In one implementation, the user creates a box by activating a mouse button or key and moving the mouse cursor. In another implementation, the user creates a box by moving the cursor around a desired object.

A selected window option 430 enables a user to capture an object by activating a mouse button or key while interacting with the object. In particular, in one implementation, after selecting to generate an application capture, a capture of the next window clicked is generated. In various implementations, specific keys or a combination of keys may generate an application capture of a specific window. For example, in one implementation, whenever a user concurrently right and left clicks (with respect to a two-button mouse) a window, an application capture of the window is generated.

A predefined portion of the screen option 440 enables a user to use a designated portion of the screen as a permanent capture area. For example, in one implementation, the bottom right corner of a screen is a designated as the capture area such that the contents of the corner are captured in an application capture when a user activates a key or clicks an option.

The previous description is an example implementation of a GUI including a capture option window. Other implementations may be organized differently or may include other features. For example, in various implementations, an option enabling users to capture multimedia within a selected area is included. The captured multimedia is sent and displayed in a recipient's personal communication.

Figure 5:
FIGS. 5 and 6 are exemplary graphical user-interfaces including an application capture feature.

Referring to FIG. 5, an exemplary GUI 500 includes an application capture feature. The GUI 500 may be displayed in response to a selection of the application capture area select option 330 in FIG. 3. The GUI 500 is an example of the selected by box option 420. In this example, a photo of a hamster is the desired content for an application capture. To facilitate capture, the user creates a box 510 to encompass the desired area. The box 510 may be created by clicking and dragging a pointer across part of the screen. Other implementations may include additional methods of creating the box 510 or other shapes. For example, in one implementation, the user may create any shape by drawing the shape with the pointer of the mouse. The user may click the send capture option 520 to send the displayed content of the user created box 510. The sent content will be rendered in the personal communication of the recipient (e.g., "Hamster Enthusiast") as well as the sender.

The previous description is an example implementation of a GUI including an application capture feature. Other implementations may be organized differently or may include other features. For example, in various implementations, multiple capture boxes may be created to send multiple areas of content concurrently.

Figure 6:
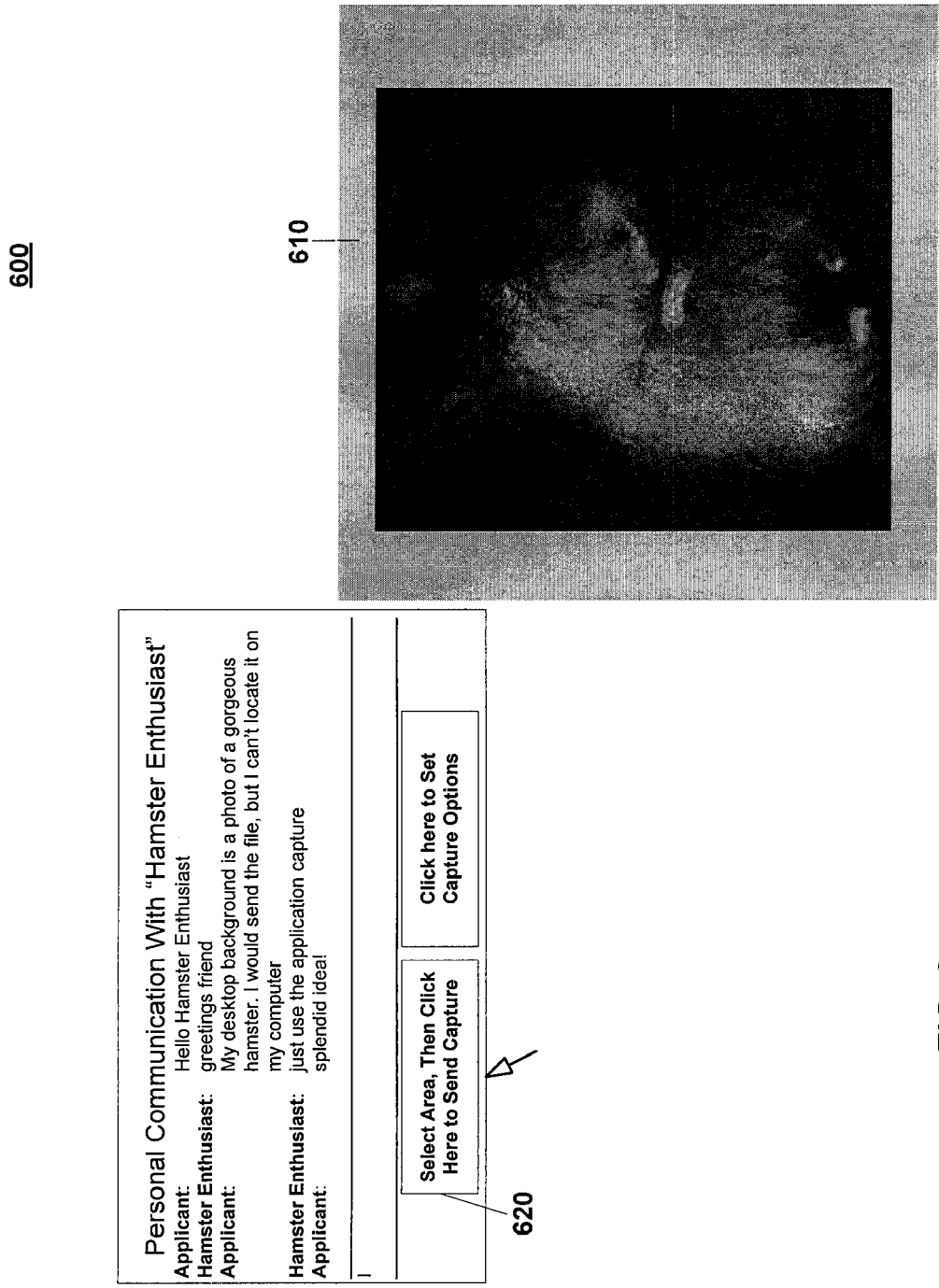

Referring to FIG. 6, an exemplary GUI 600 includes an application capture feature. The GUI 600 may be displayed in response to a selection of the application capture area select option 330 in FIG. 3. The GUI 600 is an example of the predefined portion of the screen option 440. In this example, a photo of a hamster is the desired content for an application capture and is located in a grey box 610 in the bottom right corner of the screen that is a predefined portion. To facilitate capture, the user has dragged the photo into the box 610. The grey box 610 may be a moveable object. Specifically, the user may be able to click and drag the grey box 610 to a desired location. The grey box 610 may always be "on bottom." Specifically, the grey box 610 may always be shown behind any other windows occupying the same space. The user may click the send capture option 620 to send the displayed content of the box 610. The sent content will be rendered in the personal communication of the recipient (e.g., "Hamster Enthusiast").

The previous description is an example implementation of a GUI including an application capture feature. Other implementations may be organized differently or may include other features. For example, in various implementations, multiple capture boxes may be created to send multiple areas of content concurrently.

Figure 7A:
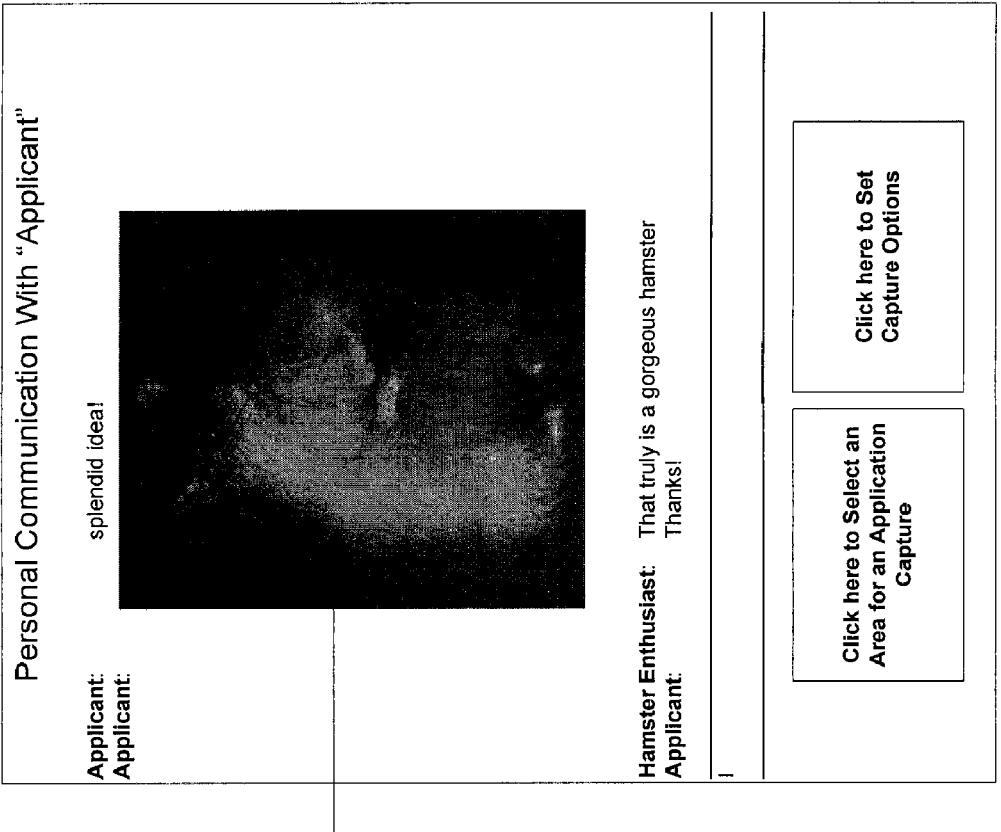
FIGS. 7A and 7B are exemplary graphical user-interfaces including a received application capture.

Referring to FIG. 7A, an exemplary GUI 700 includes a received application capture 720 in a personal communication 710. The GUI 700 may be displayed in response to a selection of the send capture option 520 or 620 of FIGS. 5 and 6. In the GUI 700, a recipient user engaged in a personal communication 710 has received an application capture 720 which is displayed within the body of the communication text as a message received from a user. In one implementation, the application capture 720 is displayed on a separate window. In various applications, the personal communication 710 includes an option to save the application capture 720 as a file.

Figure 7B:
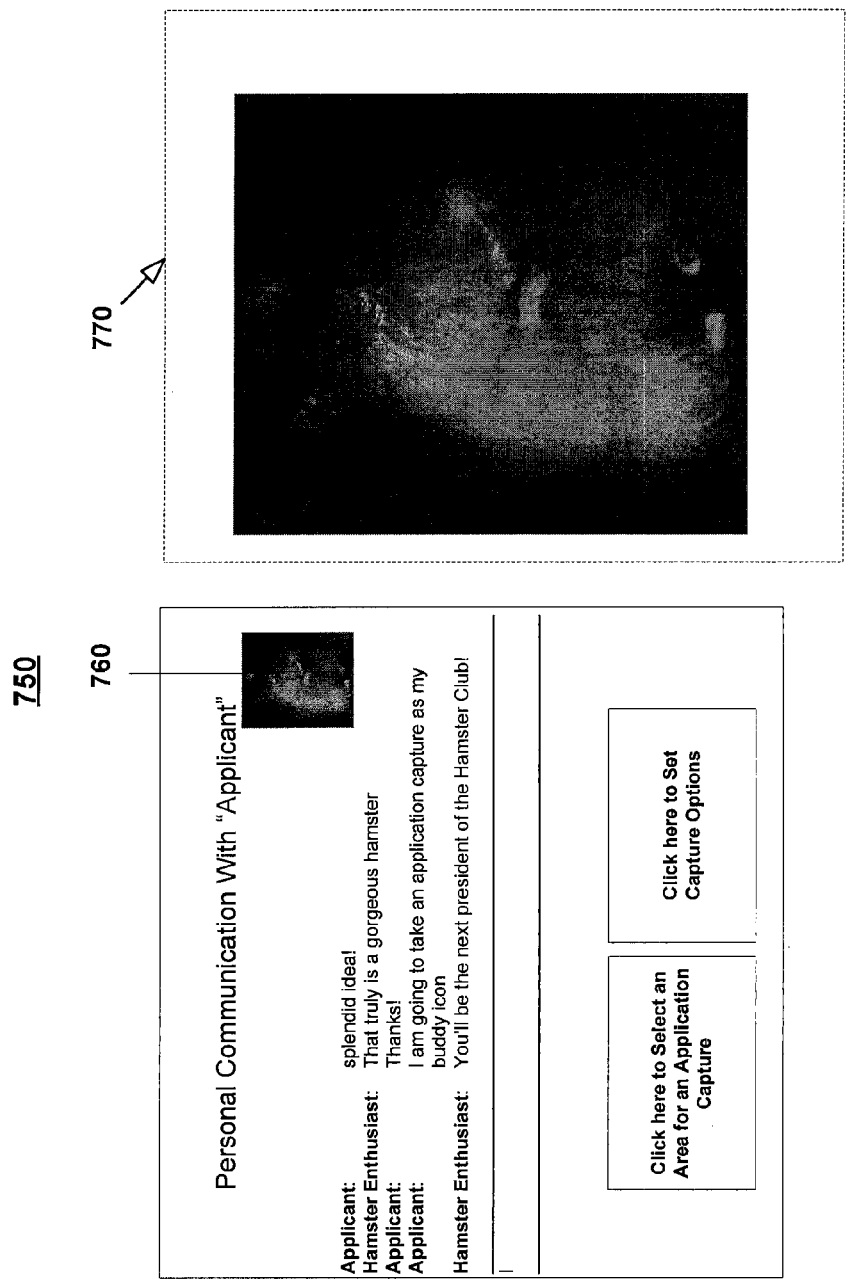

Referring to FIG. 7B, an exemplary GUI 750 includes a taken application capture icon 760 in a personal communication. In the GUI 750, a user has taken an application capture of an image 770 in order to generate a user-specific icon 760 (e.g., AOL's "Buddy Icon"). In order to assign a user-specific icon, an application capture may be generated as discussed with respect to FIGS. 5 and 6, and the application capture may be automatically set as the icon 760.

The previous descriptions are example implementations of GUIs including an application capture feature. Other implementations may be organized differently or may include other features. For example, in various implementations, when an application capture is sent, a message is first rendered on the recipient's display such that the recipient is given the option to accept or reject receipt of the application capture.

Figure 8:
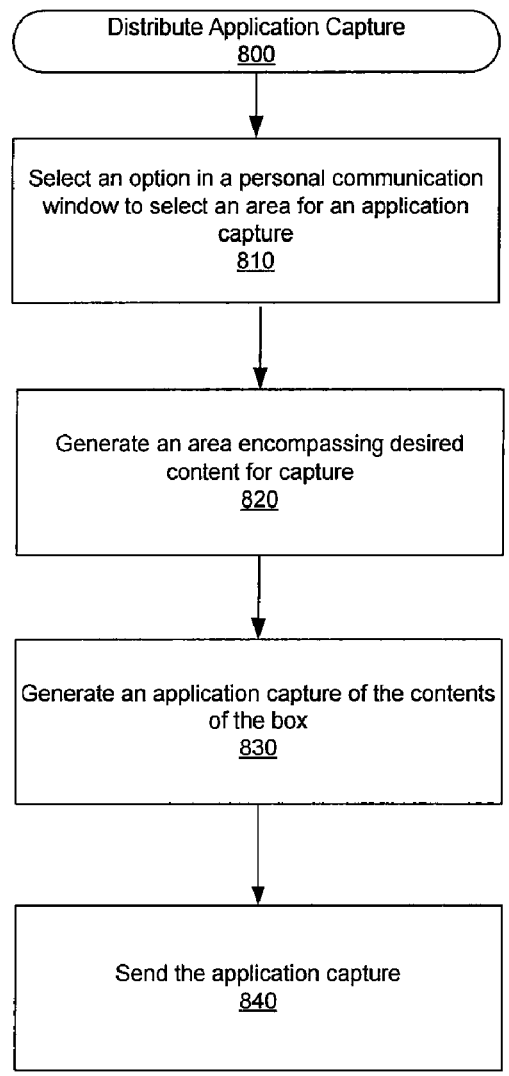
FIGS. 8 and 9 illustrate exemplary flow charts of processes to send an application capture.

Referring to FIG. 8, an exemplary process 800 distributes an application capture. The process 800 may be implemented on the system 200 of FIG. 2, or another system.

The process 800 begins when a user selects an option in a personal communication window to select an area for an application capture (810). Selecting the option may include clicking an icon displayed concurrently with communication text in a personal communication window.

The user generates an area encompassing the desired content for capture (820). The area may be a shape created or drawn by a user. The area also may be a defined portion of the screen designated as an application capture area. The user generates an application capture which includes the visual contents of the generated box (830).

The user sends the generated application capture with the personal communication (840) to another user. Sending the generated capture may include clicking to send a message, pasting an application capture into a message, or confirming a shown preview of the application capture.

The previous description is an example implementation of a process for distributing an application capture. Other implementations may be organized differently or may include other features. For example, in various implementations, generating and sending an application capture are both triggered with a single input on the personal communication.

Figure 9:
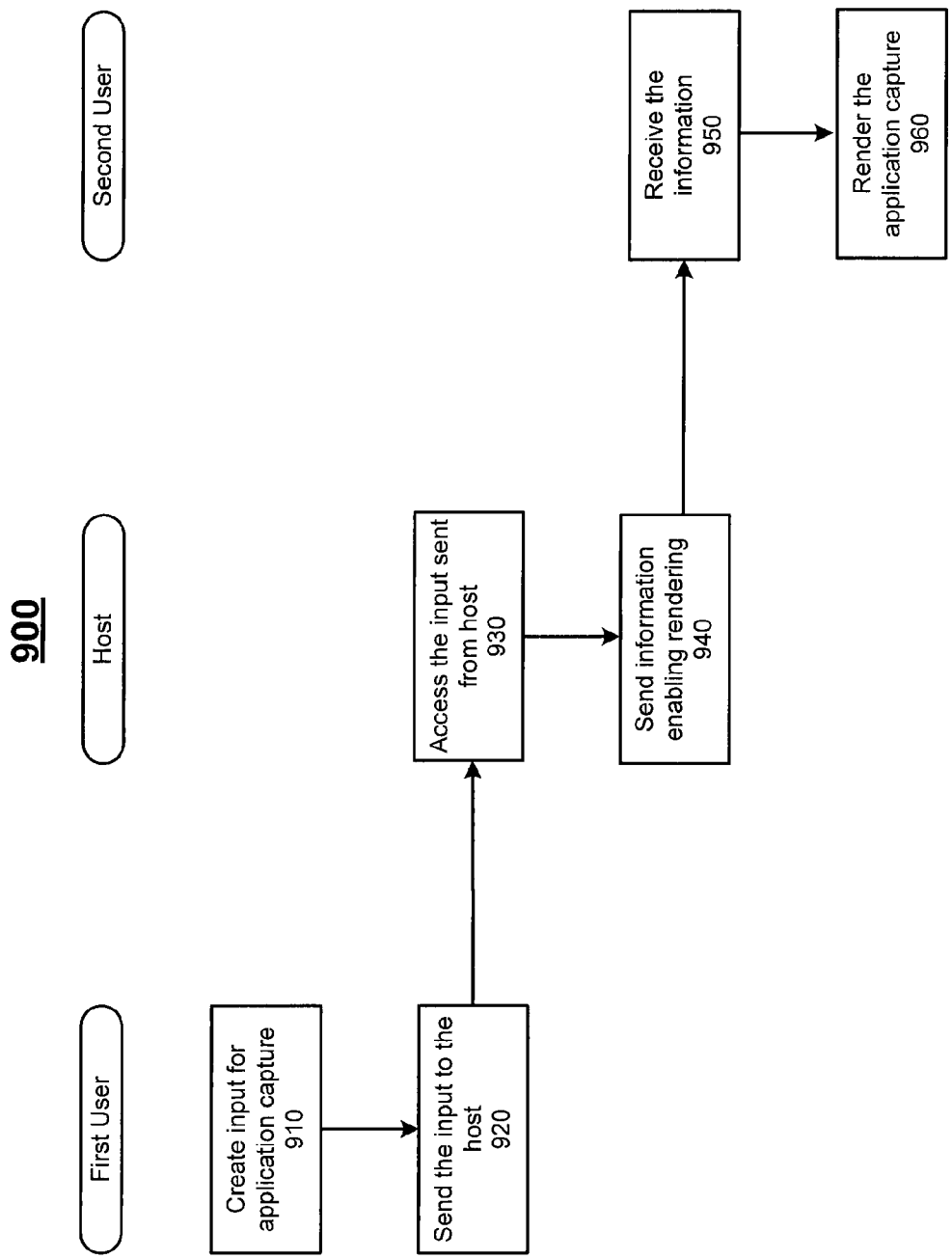

Referring to FIG. 9, an exemplary process 900 distributes an application capture from a first user to a second user through a host. The process 800 may be implemented on the system 200 of FIG. 2, or another system.

The process 900 begins when a first user creates input for an application capture (910). Creating input may include interaction with GUIs 500 or 600 for creating application captures, as discussed with respect to FIGS. 5 and 6. The created input is then sent to a host (920). In one implementation, the host is sent data configured as an image file (e.g., a bitmap file). In another implementation, the host is sent a personal communication with embedded image data.

The host accesses the input sent from the first user (930) and sends information enabling rendering of the application capture to the second user (940). In one implementation, the host redirects the received input from the first user to the second user. Redirecting the information may include adding header data to received image data that identifies the data as enabling rendering of an application capture. In another implementation, the host receives an image data and processes the image data to create a personal communication to be sent to the second user, with the personal communication including image data from the application capture.

The second user receives the information (950) and renders the application capture (960). Rendering the application capture may include rendering the GUIs 700 or 750, as discussed with respect to FIGS. 7A and 7B.

The previous description is an example implementation of a process for distributing an application capture from a first user to a second user through a host. Other implementations may be organized differently or may include other features. For example, in various implementations, the host processes the received input to generate a new file or personal communication which includes information enabling rendering of the application capture.

Figure 10:
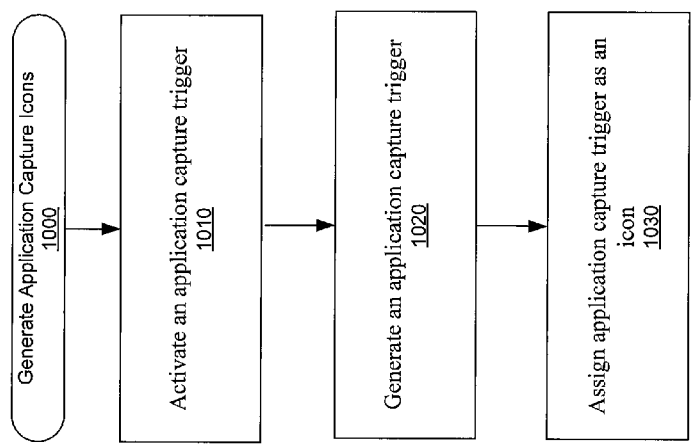
FIG. 10 illustrates an exemplary flow chart of a process to generate an icon.

Referring to FIG. 10, a process 1000 generates an icon with an application capture. The process 1000 begins when an application capture is activated (1010). The activation may include selecting an option to generate an application capture in response to a selection of an application capture area, selecting an option to generate an application capture of a predefined portion of the screen, or selecting another option.

The application capture is generated (1020) and assigned as an icon (1030). The icon may be part of a personalization option of a personal communication, such as, for example, a "buddy icon" in AOL software. The icon also may be part of a profile within the application capture program or another program. Further, the icon may be saved as an image file.

The previous description is an example implementation of a process for generating in icon with an application capture. Other implementations may be organized differently or may include other features. For example, the generated icon may be sent to a further user engaged in personal communication.

A number of implementations have been described. Nevertheless, other implementations are within the scope of the following claims and other claims to which the applicant may be entitled

What is claimed is:

1. A method for generating icons, the method comprising:
   providing a personal communications window for transmitting and receiving electronic communications;
   providing a predefined capture area, the predefined capture area being a movable object on the user's display allowing the user to move the predefined capture area independent of the personal communications window to a desired location on the user's display and, when moved to the desired location, causes the predefined capture area to be displayed behind content occupying the same space of a subset portion of the user's display as the predefined capture area;
   activating an application capture trigger;
   generating, in response to activation of the application capture trigger, an application capture of content located in the subset portion of the user's display occupying the same space of the user's display as the predefined capture area; and
   automatically assigning, with one or more processing devices, all or part of the application capture as an icon representative of a user for personal communications.

2. The method of claim 1 wherein activating an application capture trigger includes activating a trigger configured to enable generation of an application capture to be set as an icon representative of the user without requiring manual selection of a saved file corresponding to the application capture.

3. The method of claim 1 wherein generating an application capture includes generating a shape which encloses the subset portion of the user's display.

4. A method for generating a graphical user representation for a personal communication, the method comprising:
   providing a personal communications window for transmitting and receiving electronic communications;
   providing a predefined capture area, the predefined capture area being a movable object on the user's display allowing the user to move the predefined capture area independent of the personal communications window to a desired location on the user's display and, when moved to the desired location, causes the predefined capture area to be displayed behind any content occupying the same space of a subset portion of the user's display as the predefined capture area;
   receiving input activating an option to assign a graphical user representation to personal communications;
   generating, in response to the received input which activates the option to assign a graphical user representation to personal communications, an application capture of content located in the subset portion of the user's display occupying the same space of the user's display as the predefined capture area;
   assigning, with one or more processing devices, the application capture as an icon representative of a user for personal communications; and
   enabling rendering of the application capture within personal communications sent to communication recipients.

5. The method of claim 4 wherein enabling rendering of the application capture includes enabling rendering of the application capture within personal communication sent to communication recipients as an icon representative of the user without requiring manual selection of a saved file corresponding to the application capture.

6. The method of claim 4 wherein generating the application capture includes generating a shape which encloses the subset portion of the user's display.

7. A computer-readable storage medium storing instructions which, when executed by a processor, causes a computer to perform a method for generating icons, the method comprising:
   providing a personal communications window for transmitting and receiving electronic communications;
   providing a predefined capture area on a user's display, the predefined capture area being a movable object independent of the personal communications window and, when moved to a desired location on the user's display, being displayed behind content occupying the same space of the user's display as the predefined capture area;
   activating an application capture trigger;
   generating, in response to activation of the application capture trigger, an application capture of image content located in a subset portion of the user's display occupying the same space of the user's display as the predefined capture area; and
   automatically assigning, with one or more processing devices, all or part of the application capture as an icon representative of a user for personal communications.

8. The computer-readable storage medium of claim 7 wherein activating an application capture trigger includes activating a trigger configured to enable generation of an application capture to be set as an icon representative of the user without requiring manual selection of a saved file corresponding to the application capture.

9. The computer-readable storage medium of claim 7 wherein generating an application capture includes generating a shape which encloses the subset portion of the user's display.

* * * * *